July 31, 1934.    R. T. HOWES    1,968,397
PROCESS OF NEUTRALIZATION
Filed March 2, 1931
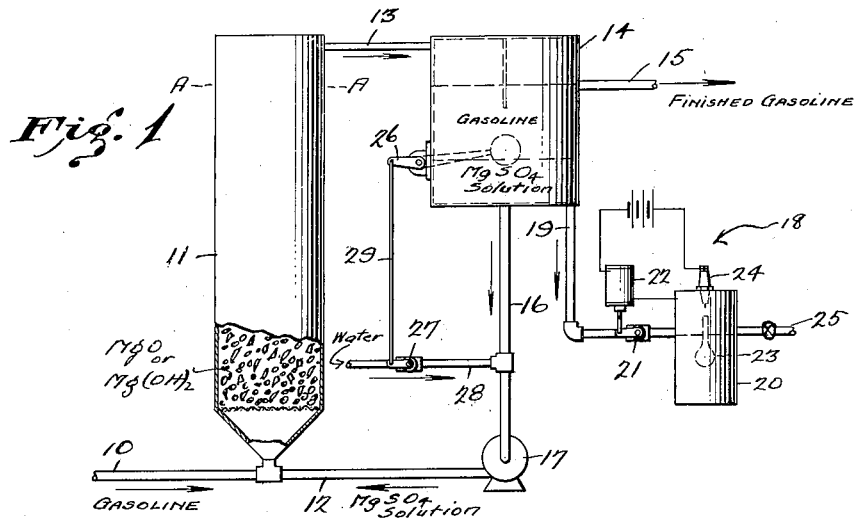
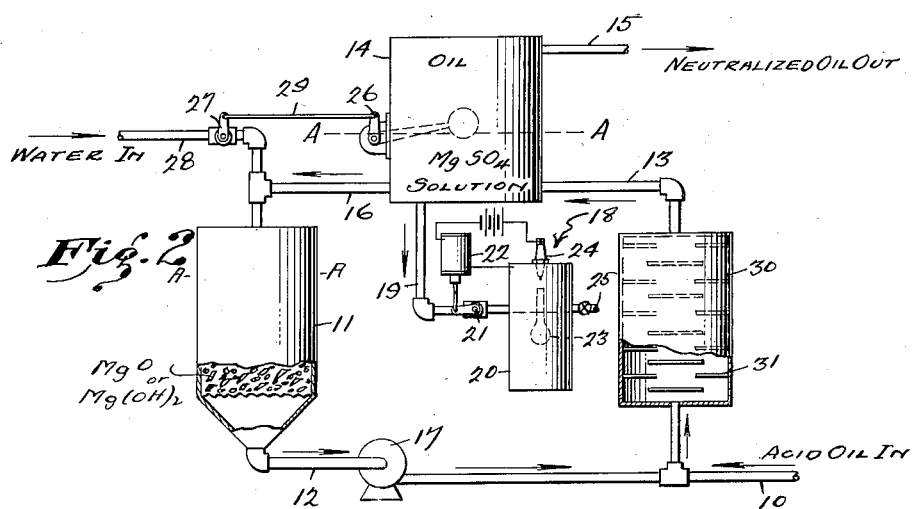
INVENTOR
Raymond T. Howes
BY
ATTORNEY Patented July 31, 1934

1,968,397

UNITED STATES PATENT OFFICE 1,968,397

PROCESS OF NEUTRALIZATION

Raymond Thayer Howes, Long Beach, Calif., assignor, by mesne assignments, to California First National Bank of Long Beach, Long Beach, Calif., a national banking association, as trustee Application March 2, 1931, Serial No. 519,356

7 Claims. (Cl. 196—41)

This invention relates to a process of neutralization and has for its principal object the elimination of acid compounds from an oil, hydrocarbon or otherwise, which has been treated with acid and thereafter contains acid in the form of mineral acid or as organic acid, and acid reaction products.

This application is a continuation in part of the co-pending application of Caldwell and Howes, Serial No. 500,968, filed December 8, 1930, and is an improvement on the copending application of Lyle Caldwell, Serial No. 447,275, filed April 25, 1930.

The process is particularly applicable to the treatment of all distillates of petroleum and analogous distillates which have been treated with sulphuric acid and then had the bulk of the acid sludge removed therefrom. After such acid treatment, however, the distillate still contains from 40 milligrams of acid (calculated as $H_2SO_4$) upwards, which is usually neutralized with caustic soda solution.

According to the present invention, such acid treated distillates are contacted with a strong solution of magnesium sulphate which is capable, according to its concentration, of taking into solution a far greater percentage of magnesium hydroxide than is possible by water, so that the neutralization of acid compounds by magnesium hydroxide is greatly accelerated because of the greater concentration of hydroxyl ions. For instance, whereas at ordinary temperatures the solubility of magnesium hydroxide ($Mg(OH)_2$) in water is about 0.001%, the solubilities of the magnesium hydroxide in magnesium sulphate ($MgSO_4.7H_2O$) solutions is as follows at like temperatures:

| Magnesium sulphate solutions | Solubility of magnesium hydroxide |
|---|---|
| Percent | Percent |
| 2.0 | 0.005 |
| 10.0 | 0.040 |
| 20.0 | 0.085 |
| 30.0 | 0.160 |
| 40.0 | 0.180 | and the solubilities increase generally up to the point of concentration of the magnesium sulphate solution where crystallization occurs, a point it is desired to keep below. A safe operating factor is found to be a saturation of 90% in a magnesium sulphate solution at normal temperatures, below which it is generally preferred to operate.

Referring to the drawing, in which Fig. 1 is a diagrammatic flow sheet for use in the process as applied to the lighter petroleum distillates, such as gasoline, kerosene, pressure distillate, or other fluid stocks, and Fig. 2 is a diagrammatic flow sheet for use in the process as applied to more stocks, such as crude oil, lubricating distillates, etc., and referring more particularly to Fig. 1, an acid treated light distillate, such as gasoline, is passed through pipe 10 to be forced upwardly through a column 11 filled to a predetermined level A—A with lump brucite, or magnesium hydroxide ($Mg(OH)_2$), or magnesium oxide (MgO) of about one-quarter (¼) inch diameter, more or less, and which has been wetted by a predetermined stream of magnesium sulphate solution of the desired concentration from the pipe 12.

The intimate contacting in column 11 of the acid oil with magnesium hydroxide in the sulphate solution chemically neutralizes acid compounds in the oil to the end that a neutralized gasoline flows through pipe 13 together with the reaction products (comprising magnesium sulphate in solution) into a separating tank 14 wherein the heavier magnesium sulphate solution sinks to the bottom while the neutralized acid solution free oil is withdrawn for use, or further treatment, through pipe 15.

Magnesium sulphate solution is continuously withdrawn from tank 14 through a pipe 16 by pump 17, which circulates the solution through pipe 12 and column 11, as described, a certain volume at a certain concentration being maintained in tank 14 by the following instrumentalities.

Depending on the desired concentration of magnesium sulphate solution, a hydrometer control, generally indicated by the numeral 18, is connected by a pipe 19 to the bottom of tank 14 and comprises a chamber 20 into which pipe 19 feeds, a valve 21 in pipe 19, a solenoid 22 for operating valve 21, a hydrometer 23 in chamber 20, an electric circuit including a battery closed by hydrometer 23 for operating the solenoid 22, a contact point 24, and a discharge pipe 25.

Chamber 20 and hydrometer 23 (which may be guided centrally in chamber 20) are made of metal to the end that when the concentration of magnesium sulphate in tank 14 exceeds a desired maximum, hydrometer 23 will rise to touch contact 24 and close the circuit thereby energizing solenoid 22, which closes valve 21.

When valve 21 is thus closed, the liquid level of the sulphate solution in tank 14 is raised (there being now substantially no discharge through pipe 19) whereby a float actuated lever 26 opens a valve 27 in water pipe 28 by means of a connecting rod 29. This permits a predetermined amount of water to be supplied to the sulphate solution in pipe 16, thereby reducing its concentration and thus finally reducing its concentration in tank 14 and the supply of water will thus be continued until hydrometer 23 will fall and break the circuit, thereby opening valve 21, whereupon the level of the sulphate solution in tank 14 will fall, permitting the float actuated lever 26 to close water valve 27.

In order to accurately gage the concentration of the sulphate solution in tank 14, it will be understood that there is always a minute leak provided in valve 21, which assures continuous discharge through chamber 20 and pipe 25 except when the apparatus is out of operation. The apparatus will thus function in a balanced condition, a small quantity of solution being continually drawn off (by the leak in valve 21) and a small quantity of water being continually added through valve 27, the object being to maintain the volume of solution in the system substantially constant.

By thus taking increased quantities of magnesium hydroxide into solution in column 11, it will be clearly seen that a double reaction takes place. First, the magnesium hydroxide dissolves in the magnesium sulphate solution and then reacts with the acid to increase the concentration of the sulphate solution, to the end that the oil is rapidly and completely neutralized and a continuous operation is assured. The volume of sulphate solution circulated is to a large extent dependent on the acid content of the stock under treatment, but in general the quantity of solution may be from 5% to 10% of the acid oil, but much smaller quantities may be satisfactorily used.

Referring to Fig. 2, when treating heavier oils, much larger volumes of solution may be required, in some instances from five to ten volumes of solution to one volume of acid oil, especially when such acid oil is high in sulphur and of a viscous character. In such cases it is not advisable to pass the oil through the column 11 due to high viscosity, etc., but it is better to provide a separate contact chamber.

Similar instrumentalities to those already described are used with the addition of a separate contact chamber 30 provided with baffles 31. The sulphate solution from tank 14 is passed downwardly through the magnesium hydroxide in column 11 picking up its charge of Mg(OH)$_2$ and is then passed by pump 17 into chamber 30, together with a stream of viscous acid oil from pipe 10. Chamber 30 provides intimate and prolonged mixing of the oil and reagent to assure neutralization when the mixture passes into tank 14 to be separated therein. The control of the concentration of the solution is accomplished in a manner already described.

I claim as my invention:

1. A process of neutralization which comprises: contacting hydrocarbon oil containing sulphuric acid derivatives with a solution of magnesium hydroxide and magnesium sulphate; the concentration of the magnesium sulphate being between 2% and 90% at the commencement of the treatment.

2. A process of neutralization which comprises: contacting hydrocarbon oil containing sulphuric acid derivatives with a solution of magnesium hydroxide and magnesium sulphate; the concentration of the magnesium sulphate being just below the point of crystallization of the magnesium sulphate at the commencement of the treatment.

3. A process of neutralization which comprises: flowing a stream of hydrocarbon oil containing sulphuric acid derivatives conjointly with a stream of magnesium hydroxide and magnesum sulphate solution to intimately mix the same, and separating the solution from the oil after neutralization of the acid derivatives.

4. A process of neutralization which comprises: flowing a stream of hydrocarbon oil containing sulphuric acid derivatives conjointly with a stream of magnesium hydroxide and magnesium sulphate solution to intimately mix the same, whereby the concentration of the hydroxide is reduced and the concentration of the sulphate is increased, separating the solution from the oil, and reducing the concentration of sulphate by adding water thereto, and again mixing said solution stream with said acid oil stream in the presence of granular magnesium hydroxide.

5. A process of neutralization which comprises: circulating a stream of magnesium sulphate solution in a closed ring, adding magnesium hydroxide to the stream, contacting hydrocarbon oil containing sulphuric acid derivatives with the stream, whereby the magnesium hydroxide concentration is reduced and the magnesium sulphate concentration is increased, separating the solution from the oil, continually withdrawing a small portion of solution from the ring, and continually adding a small portion of water to the ring.

6. A process of neutralization which comprises: continuously circulating a stream of magnesium sulphate solution in a closed ring containing magnesium hydroxide, and continuously adding hydrocarbon oil containing sulphuric acid derivatives to and withdrawing oil from said stream.

7. A process of neutralization which comprises: continuously circulating a stream of magnesium sulphate solution in a closed ring containing magnesium hydroxide, continuously adding hydrocarbon oil containing sulphuric acid derivatives to and withdrawing oil from said stream, continuously drawing off a small portion of solution from said ring, and continuously adding water to said ring.

RAYMOND THAYER HOWES.